Figure 1:
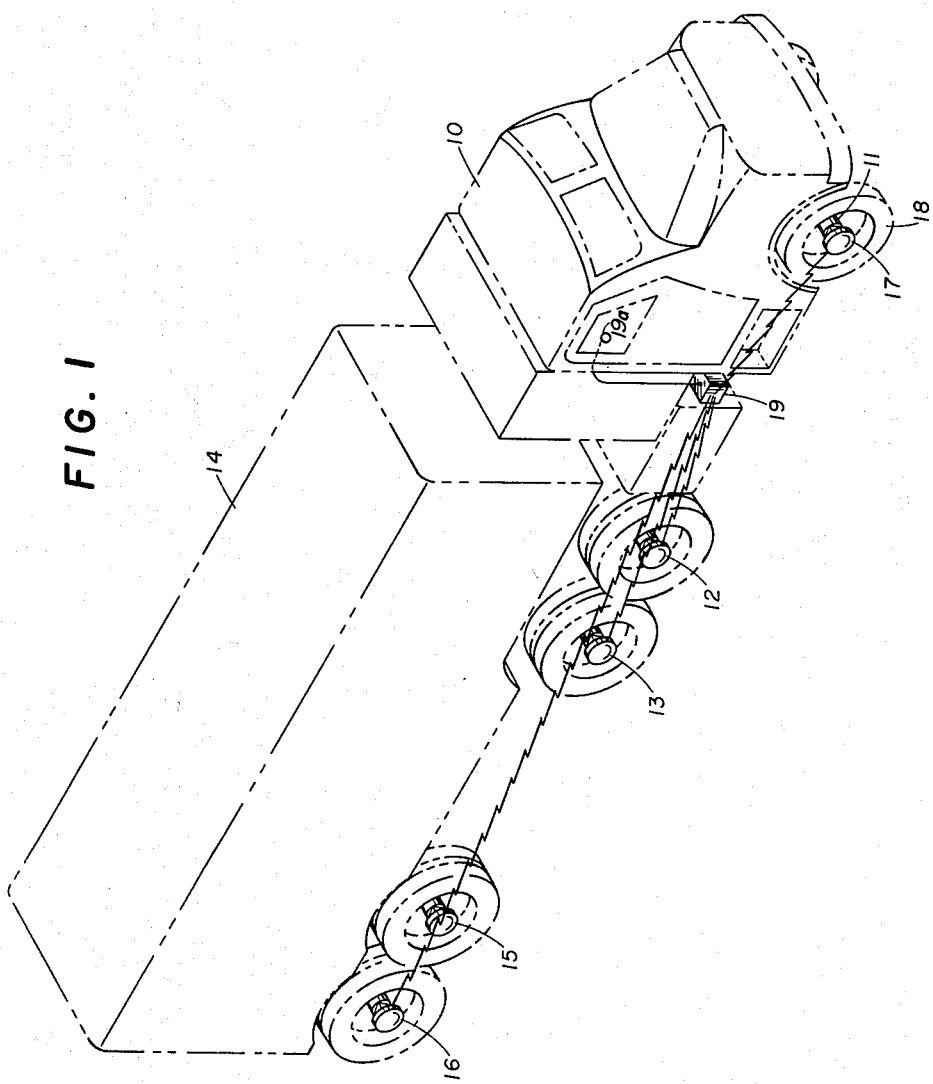

April 13, 1965 R. L. MILLS 3,178,686
PULSED TIRE PRESSURE MONITOR
Filed Feb. 29, 1960 2 Sheets-Sheet 1

ROBERT L. MILLS
INVENTOR.
BY

April 13, 1965   R. L. MILLS   3,178,686
PULSED TIRE PRESSURE MONITOR
Filed Feb. 29, 1960   2 Sheets-Sheet 2
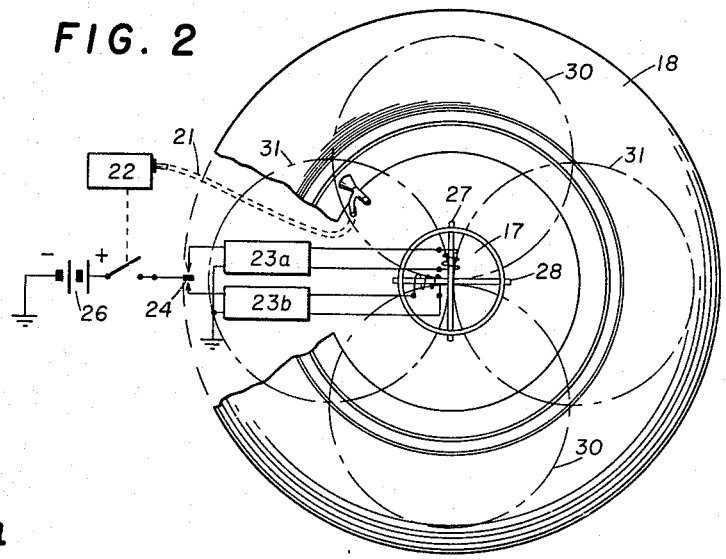
FIG. 2
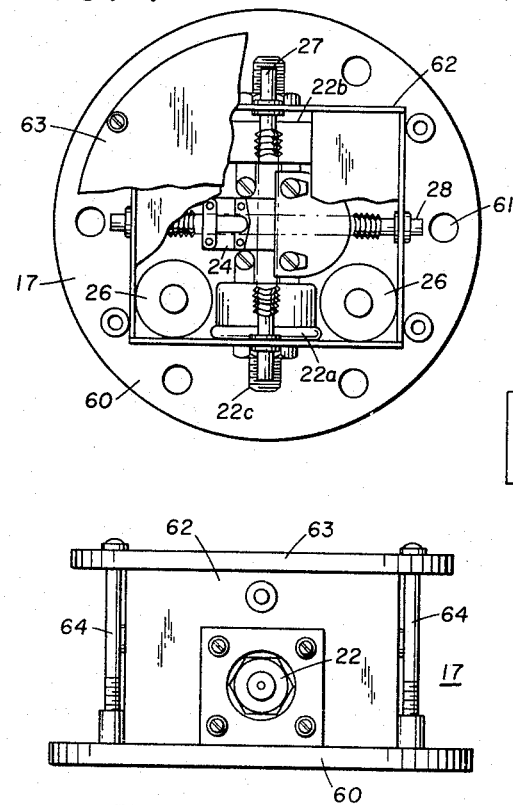
FIG. 4
FIG. 5
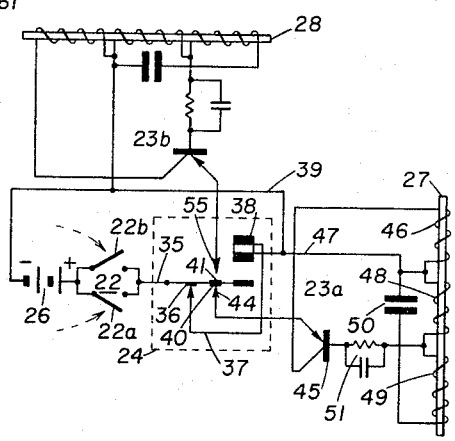
FIG. 3
ROBERT L. MILLS
INVENTOR.
BY United States Patent Office 3,178,686
Patented Apr. 13, 1965

3,178,686
PULSED TIRE PRESSURE MONITOR
Robert L. Mills, Dallas, Tex., assignor to Metallurgical Resources, Inc., Dallas, Tex., a corporation of Delaware
Filed Feb. 29, 1960, Ser. No. 11,694
9 Claims. (Cl. 340—58)

This invention relates to tire pressure monitoring and more particularly to a method and apparatus employing low radio frequency waves for monitoring tire pressure.

Various systems have been heretofore devised for providing a warning to an operator when one or more tires on a vehicle are low in pressure. Operation at low pressures can readily bring about damage, so that a reliable warning system is most desirable. Prior art systems have included those employing radio frequencies whereby a conductive circuit between a rotating wheel and the vehicle body carrying or otherwise supporting an indicator is eliminated. However, in order to assure reliable operation and at the same time comply with administrative regulations, it has been found desirable to limit operations to low frequencies.

The present invention is directed to a system and a method for producing an alarm indicative of low tire pressure while employing electromagnetic wave communication within the low radio frequency band. It is an object of the present system to provide a low radio frequency tire alarm system which may operate at a power level adequate to insure communication of an indication of low pressure and to avoid unauthorized radiation.

In accordance with the present invention, there is provided an alarm system for a pneumatic tire on a vehicle which comprises a pair of transmitting coils having similar directional characteristics differently oriented one with respect to the other and mounted for rotation with the tire to be monitored. The coils form electromagnetic wave transmitters. An excitation circuit is provided and is interconnected with said coils by means of a tire pressure responsive actuating switch system adapted alternately to connect first one and then the other of the coils to the excitation circuit for alternate transmission from said coils to establish an omni-directional field. A receiver positioned within the field of said coils is provided with means for actuating an indicating means upon occurrence of low tire pressure.

In accordance with a further aspect of the invention, a method is provided for monitoring tire pressures on a vehicle by continuously sensing tire pressures and in response to pressure below a predetermined level, establishing alternate high frequency electromagnetic fields for preferential signal transmission first in a direction perpendicular with the axis of said tire and then in a second direction perpendicular to the first direction and to the axis of said tire alternating at a rate which is high relative to the maximum rate of rotation of the tire and which is low compared with the frequency of said fields. Signals of such high frequency characteristics are sensed at a fixed point on the vehicle and in response thereto, there is generated a warning indicator for the presence of such signals.

In accordance with a further aspect of the invention, a pair of transmitting antennas having preferred transmission directions are oriented for transmission in different directions and are alternately excited. A receiver fixed in the field of influence of said antennas is adapted to receive signals therefrom. The antennas in response to low tire pressures alternately are excited whereby regardless of orientation of said antennas with respect to said receiver, a signal may be received.

In accordance with a further aspect of the invention, a pair of crossed ferrite antennas are coupled to an excitation circuit by way of a vibrating system operable only upon the presence of low tire pressure and adapted to generate an audible signal while alternately connecting the excitation circuit first to one and then to the other of said antennas.

For a more complete understanding of the present invention and for a further description thereof, reference may now be had to the following description taken in conjunction with the accompanying drawings in which:

FIG. 1 is a perspective view of an alarm equipped truck;
FIG. 2 is a side view of one of the wheels of FIG. 1;
FIG. 3 is a schematic diagram of a transmitter unit;
FIG. 4 is an enlarged view of the transmitter unit of FIG. 2; and
FIG. 5 is a side view of the unit of FIG. 4.

Referring now to FIG. 1, a tractor unit 10 having a front axle 11 and a pair of rear axles 12 and 13 is adapted to operate in conjunction with a trailer unit 14 having a pair of axles 15 and 16. On each end of each of the axles 11, 12, 13, 15, and 16, there is mounted a small radio frequency transmitter unit such as the unit 17 on the front axle 11. As will hereinafter be explained, tire pressures such as the pressure in tire 18 is continuously sensed. When the pressure falls below a predetermined level, the transmitter 17 is energized for the transmission of radio frequency waves. A receiver unit 19 suitably mounted on the vehicle body is adapted to detect transmission from any one or all of the transmitters carried by the truck. An alarm, either visible or audible or both, may then be provided where it will come to the attention of the operator of the truck 10 so that he can take remedial steps to prevent unnecessary damage to the tire or tires exhibiting such low pressure.

The present invention is directed particularly to the use of radio frequency signals in which transmission from a given transmitter is pulsed, and is not continuous, in response to low tire pressure. More particularly, referring to FIG. 2, tire 18 and the transmitter unit 17 are illustrated with certain of the elements thereof shown partially in diagrammatic form. The transmitter includes a pressure connection to the tire 18 as by way of tube 21. Tube 21 is terminated in a pressure-actuated unit 22 having an associated switch 22a which serves to energize radio frequency transmitters 23a and 23b by way of a vibrator unit 24. The transmitters 23a and 23b are supplied with power by a suitable source such as battery 26. The output of the transmitter 23a is applied to windings on a first ferrite antenna core 27. Alternately therewith, the output of transmitter 23b is applied to a second ferrite antenna core 28.

In contrast with prior alarm systems, the present system is free from any nulls or dead spots in the effective radiation pattern thereof so that even when the tractor 10, FIG. 1, is not moving, the existence of a low tire pressure can be sensed. More particularly, excitation of the winding of antenna 27 produces radiation having a field pattern of the general form indicated by the dotted lines 30. Excitation of a coil on antenna 28 produces radiation having a field pattern of the general form indicated by the dotted lines 31. Simultaneous excitation of both antennas will produce a directional pattern the same as either pattern 30 or pattern 31 with either the same orientation or shifted therefrom, depending upon the phase angle between the exciting currents. To assure positive alarm upon low pressure even with the tractor 10 and/or trailer 14 parked with the wheels such as wheel 18 in any position, alternate energization of the antennas 27 and 28 assures radiation of sufficient magnitude in any direction for detection and utilization to produce a suitable alarm. By such operation there is produced a radiation field which effectively substantially is omni-directional.

Referring now to the more detailed schematic diagram of FIG. 3, there are illustrated the antennas 27 and 28 energized from battery 26 by way of switch 22 and vibrator unit 24. More particularly, the positive terminal of battery 26 is connected to both arms 22a and 22b of switch 22. When transmitter 17 is employed only on a single tire, installation as on the front of truck 10, either switches 22a or 22b, may be employed. When on an axle supported by dual wheels, both switches 22a and 22b are employed, one switch being controlled by pressure in one tire and the other switch being controlled by pressure in the other tire. By this means either switch is adapted to be closed when pressure in either tire is below a predetermined minimum. Switch 22 is connected to the armature 35 of vibrator unit 24. A power circuit for the vibrator is completed between contact 36 and conductor 37 which leads to an actuating coil 38. Conductor 39 serves to connect coil 38 to the negative terminal of battery 26. A second set of contacts on the vibrator are employed for completing circuits first to the transmitter 23a to energize the antenna 27 and then to the second transmitter 23b to energize antenna 28. More particularly, the emitter of a transistor 45 is connected to contact 44 in the vibrator 24. The collector of transistor 45 is connected to a coil 46 on antenna 27 and then by way of conductor 47 to the negative terminal of battery 26. Conductor 47 is also connected to a second coil 48 on antenna 27 which in turn is connected to a third coil 49 on antenna 27. A condenser 50 serves to couple conductor 47 to the second terminal of coil 49. The base of transistor 45 is connected by way of the biasing network 51 to the juncture between coils 48 and 49.

In operation, when contact 44 dwells on the contact 40, transmitter 23a is energized whereby radio frequency signals generated in the transmitter oscillator network 23a are radiated by the antenna 27. When contact 55 dwells on armature terminal 41, the transmitter circuit 23b, preferably identical in all respects with the transmitter circuit 23a, is energized by radiation of radio frequency signals by antenna 28.

Vibrator 24 is of a type well known in the art. Current flow through coil 38 attracts armature 35 in a direction to open the circuit between contacts 36 and 37. Opening this circuit interrupts the flow of current, disrupting the attractive force of coil 38. This permits the armature to return to its normal position to close the circuit between contacts 36 and 37. A spring element (not shown) is employed which tends to return armature 35 to its normal position. However, the inertia of the armature prevents immediate return and in fact causes the armature to close the circuit between contacts 41 and 55. Thus by operation of the vibrator 24, the transmitters 23a and 23b alternately are energized.

In a preferred embodiment of the invention, the vibrator 24 is operated at a switching rate which is high compared to the maximum rate of revolution of the wheel on which it operates so that there will be a relatively rapid transition from one radiation field to another. When so operated there is avoided possible synchronism between the switching rate and wheel speed, a condition which possibly would permit the receiver 19, FIG. 1, to operate in a field null.

Commercially available vibrators operate at a frequency of the order of 100 cycles per second which has been found to be wholly satisfactory although the specific rate can be changed by varying the physical constants of the vibrator structure.

FIGS. 4 and 5 show one embodiment of a transmitter unit such as unit 17 in plan and elevation, respectively. All of the elements of the transmitter are mounted on a plate 60 which is provided with holes such as holes 61 to facilitate mounting on the end of an axle. The pressure-actuated switch 22a is mounted on one side of the transmitter housing and is provided with a threaded coupling 22c to receive tubing such as tubing 21, FIG. 2. Similarly, the switch 22b is mounted on the other side of the housing 62 and is adapted to be connected to a tubing leading to a second tire. Batteries 26 such as dry cell units, are mounted in the corners of the housing 62. The ferrite antennas 27 and 28 are mounted to extend through the housing 62, being oriented perpendicular with respect to each other and to the axle upon which they are mounted. Antennas 27 and 28 are shown broken away in order that the vibrator 24 might be seen. By such construction the size of the alarm unit may be maintained within the limits permissible. Preferably the transmitter unit will not protrude beyond the plane of the edge of an associated tire and thus will be protected by the tire from damage. A closure plate 63 serves to secure the transmitter housing 62 in place, bolts 64 serving to force plate 63 onto the housing 62.

Obviously from an economic point of view, it is preferable to employ identical units on each wheel. In such case, however, the occurrence of a low pressure indication on the output of the receiver unit in itself is ambiguous in that an operator does not know which tire is faulty. In FIG. 1, 18 tires are employed on the tractor 10 and trailer 14. While a pressure measurement on each of the tires would readily identify the tire or tires in question, immediate identity is possible through the present invention. More particularly, characteristic of the operation of vibrator 24, a relatively low level audio frequency signal can be heard. An operator, therefore, upon noting actuation of the tire alarm, can quickly identify the location of its source by locating the source of such sound. If desired, a more distinctive sound source may be employed such as a bell or other alarm, but from practice it has been found adequate merely to employ the vibrator 24.

The receiver circuit has not been shown in detail. In practice a commercial broadcast receiver has been found to be satisfactory. A ferrite antenna such as antenna 27 or 28 will be found preferable in such receiver. The receiver operated in the low end of the broadcast band and tuned to the frequency of signals from the transmitters 23a and 23b, has been found adequate for the production of the suitable warning signals. Since the vibrator 24 operates in the low audio frequency range effectively to provide modulation of the composite signal from transmitters 23a and 23b, an audio signal of vibrator frequency is present in the receiver output. Such signal may be employed directly as the warning signal or it may be employed to actuate any such other warning unit or indicator 19a as may be desired.

Receiver unit 19 is mounted on tractor 10 or on the trailer 14 as desired. For almost any given position, there will be an orientation of the receiving antenna most suitable for signal reception from all transmitters. Trial and error has been practiced rapidly to orient the receiver antenna in almost any location on the tractor or trailer. Preferably the receiver will be mounted on the tractor 10 to avoid use of a conductive alarm circuit extending between the trailer 14 and the tractor 10. In any event, the reliable transmission of a signal is assured regardless of the position of a given wheel whether standing still or when underway.

In the foregoing, it will be seen that there is provided an unique transmission system for positive monitoring of tire pressures, wherein tire pressure is continuously sensed and in response to pressure below a predetermined level there is alternately established mutually perpendicular electromagnetic radiating fields at a repetition rate high compared with the rate of revolution of the tire and which fields bear a fixed orientation relative to the tire with which they rotate. Signals indicative of low pressure having the frequency of said fields are then detected in a zone of influence thereof and an indication of low pressure from such signals is thereby established.

Having described the invention in connection with certain specific modifications thereof, it is to be understood that further modifications may now suggest themselves to those skilled in the art and it is intended to cover such modifications as fall within the scope of the appended claims.

What is claimed is:

1. An alarm system for a pneumatic tire on a vehicle which comprises a pair of electromagnetic wave transmitters each having directional characteristics differently oriented one with respect to the other and mounted for rotation with said tire, an excitation circuit including an actuating switch operable upon the occurrence of pressure in said tire below a predetermined level alternately for energizing first one and then the other of said transmitters to establish an average omni-directional field, and a receiver system including indicating means carried by said vehicle mounted for reception of signals of said omni-directional field for actuating said indicating means upon occurrence of low tire pressure.

2. An alarm system for a pneumatic tire on a vehicle which comprises a pair of transmitting coils mounted for rotation with said tire with the axes of said coils and the axis of said wheel mutually orthogonal, an excitation circuit for said coils, means including a pressure sensitive switch connected to said tire and to said excitation circuit for alternately connecting first one and then the other of said coils to said excitation circuit when the pressure in said tire is below a predetermined level, and a receiver positioned to receive signals from said coils.

3. An alarm system for a pneumatic tire of a vehicle which comprises a pair of radio frequency transmitters each having a directional antenna, means for mounting said antenna for rotation mutually perpendicular one to the other in planes which are perpendicular to the axis of said tire, an excitation circuit including an actuating switch operable in response to pressure in said tire below a predetermined level alternately for energizing first one and then the other of said transmitters, a receiver including an indicator mounted on said vehicle for reception of signals of said omni-directional field for actuating said indicator upon energization of said transmitters.

4. A system for monitoring pressure in a vehicle tire which comprises a pair of antenna mutually perpendicular one to the other and mounted for rotation about the axis of said tire, a radio frequency excitation circuit for each said antenna, and a power circuit for said excitation circuits including a D.C. source, a switch operable in response to pressure in said tire, and a vibrator connected in series in said power circuit, said vibrator being adapted alternately to energize first one and then the other of said excitation circuits from said D.C. source upon closure of said pressure switch.

5. In an alarm system for pneumatic tires, the combination which comprises a pair of electromagnetic wave transmitters each having directional transmission characteristics and differently oriented one with respect to the other and mounted for rotation with said tire, excitation means for each of said transmitters, control means connected between said tire and said excitation means for cyclically actuating first one and then the other of said transmitters in response to tire pressure below a predetermined level for establishing a detectable electromagnetic radiation field indicative of low tire pressure, and means for concomitantly establishing in the vicinity of said tire a second field of detectable energy other than said electromagnetic radiation field.

6. The combination set forth in claim 5 in which said second field is established by an electromechanical element connected to said control means.

7. The combination set forth in claim 5 in which said second field is a sound field established by a vibrating element connected to said control means.

8. The combination comprising a wheeled vehicle, radio transmitter means carried by each axle of said vehicle and tuned to the same frequency, control means coupled to each tire on said vehicle and to one of said transmitter means for energizing one of said transmitter means in response to a drop in tire pressure below a control level, receiver means carried by said vehicle tuned to said frequency for detecting a signal from any of said radio transmitter means and including a first warning signal means, and means independent of said receiver and responsive to said control means for actuating a second warning signal means.

9. An alarm system for a pneumatic tire on a vehicle which comprises a pair of dipole antennas each having directional characteristics and oriented as to lie with their axes mutually perpendicular one to the other in planes which are perpendicular to the axis of said tire and supported for rotation with said tire, an excitation circuit for said antennas including an actuating switch operable upon the occurrence of pressure in said tire below a predetermined level and including further switching means alternating at a relatively low rate to energize first one and then the other of said antennas to establish an average field which is omni-directional, and a receiver system including a detector mounted at a point spaced from said antennas substantially adjacent to said planes and further including indicating means carried by said vehicle to receive and indicate signals of said omni-directional field upon the occurrence of low tire pressure.

References Cited by the Examiner
UNITED STATES PATENTS

| | | | |
|---|---|---|---|
| 1,486,209 | 3/24 | Wesche | 340—58 |
| 2,203,871 | 6/40 | Kock | 340—33 |
| 2,407,361 | 9/46 | Wilson | 340—213 |
| 2,440,737 | 5/48 | Cawein | 343—797 XR |
| 2,727,221 | 12/55 | Sprigg | 340—58 |
| 2,860,321 | 11/58 | Strickland et al. | 340—58 |
| 2,981,832 | 4/61 | Mattson | 325—15 |
| 3,016,515 | 1/62 | Summers et al. | 340—58 |

NEIL C. READ, *Primary Examiner.*
BENNETT G. MILLER, *Examiner.*